United States Patent

[11] 3,624,546

| [72] | Inventor | Carl M. Ferrar<br>Rockville, Conn. |
|---|---|---|
| [21] | Appl. No. | 794,624 |
| [22] | Filed | Jan. 28, 1969 |
| [45] | Patented | Nov. 30, 1971 |
| [73] | Assignee | United Aircraft Corporation<br>East Hartford, Conn. |

[54] VARIABLE COUPLING LASER RESONATOR
8 Claims, 3 Drawing Figs.

| [52] | U.S. Cl. | 331/94.5, 350/6 |
|---|---|---|
| [51] | Int. Cl. | H01s 3/00 |
| [50] | Field of Search | 331/94.5; 350/6, 7 |

[56] References Cited
UNITED STATES PATENTS

| 3,410,641 | 11/1968 | Bergman | 331/94.5 |
| 3,466,566 | 9/1969 | Patel | 331/94.5 |

*Primary Examiner*—Ronald L. Wibert
*Assistant Examiner*—V. P. McGraw
*Attorney*—Donald F. Bradley ABSTRACT: A pair of flat-reflecting mirrors are positioned at approximately right angles to each other with a small variable gap between the mirrors. The mirror pair is used as the output mirror for a laser oscillator. Variation of the gap between the mirrors will vary the extraction of laser beam power from the laser oscillator, and simultaneous rotation of both mirrors permits steering of the laser output beam.

PATENTED NOV 30 1971    3,624,546

INVENTOR
CARL M. FERRAR
BY Donald J. Bradley
ATTORNEY

VARIABLE COUPLING LASER RESONATOR

BACKGROUND OF THE INVENTION

1. Field of the Invention

This invention relates to resonator mirrors for laser oscillators, and particularly to a mirror configuration which will provide variable output power from a laser oscillator.

A further feature of this invention is the provision for steering the output beam from the laser oscillator over a wide range by rotating the mirror configuration.

2. Description of the Prior Art

In the past, in order to optimize the power extracted from a laser oscillator, it has been required to use interchangeable output mirrors or separate intraresonator output coupling elements. The use of separate mirror elements is not only expensive, but the time required to change from one to the other is inconvenient. The present invention overcomes the disadvantages of the prior art by providing continuous variable output coupling, permitting optimization of the power extracted from the resonator.

The output mirror configuration of this invention allows for either manual or automatic servocontrol of the coupling for continuous maximization of the laser output power even in cases where various parameters of the resonator and the amplifying laser medium are subject to unpredictable variations.

A further advantage of this invention over the prior art is that the output beam can be steered over a wide range of angles by means of a simple adjustment of the mirrors. This feature makes possible the elimination of beam-steering optics external to the resonator, a significant advantage when high-laser power levels necessitate the water cooling of beam-handling or beam-steering optics.

SUMMARY OF THE INVENTION

A primary object of this invention is to provide a laser resonator with variable output coupling.

Another object of this invention is a novel laser resonator by which the output beam can be steered over a wide range of angles.

In accordance with the present invention, the output reflector for a laser oscillator comprises two flat 100 percent reflecting mirrors set at approximately right angles to each other with a gap therebetween, the mirrors being positioned along the optical axis of a laser amplifier. Provision is made for manual or automatic positioning of either or both mirrors so that the gap or spacing between the two mirrors is continuously variable.

In one embodiment of this invention the two-reflecting mirrors are positioned with the ends of the mirrors substantially adjacent, the output beam thereby being transmitted along a line substantially coincident with the axis of the laser amplifier.

In another embodiment of this invention, one-reflecting mirror extends substantially beyond the end of the other mirror, and the output beam is deflected substantially perpendicular to the axis of the laser amplifier. In this embodiment the mirrors are mounted with provision for rotating both mirrors simultaneously about the line of intersection of the mirror planes and/or about the optical axis of the laser amplifier to provide beam steering.

DESCRIPTION OF THE PREFERRED EMBODIMENT

Figure 1:
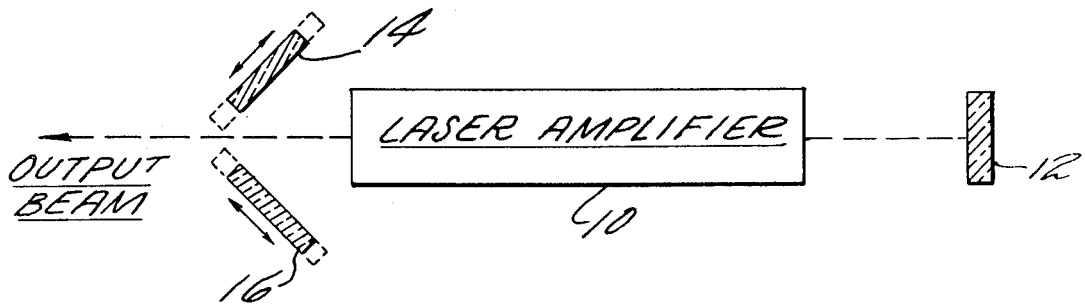
FIG. 1 shows schematically a laser oscillator configuration for variable output coupling and a fixed output beam.

In FIG. 1 there is shown a laser amplifier 10 which may be any type of amplifier such as ruby, carbon dioxide, etc. A resonator cavity is formed by a flat-reflecting mirror 12 at one end of the laser amplifier, and a pair of flat 100 percent reflecting mirrors 14 and 16 at the other end of the laser amplifier reflecting mirrors 14 and 16 are set at approximately right angles to each other. The combination of mirrors 14 and 16 constitutes a reflector similar to the well-known rooftop reflector but differing from the conventional rooftop reflector in having a gap between the two mirrors.

Provision is made for manually or automatically positioning mirrors 14 or 16, or both, such that the spacing between the two mirrors is continuously variable. A servo mirror control may be connected with mirror 14 and/or mirror 16 to position the mirror or mirrors at any point along a line lying in the plane of the mirrors. Any other well-known positioning means may be used.

When the proper population inversion is provided in the laser amplifier 10 by any well-known means such as flash lamps, gas discharge, etc., oscillation of the laser is initiated and an output beam is produced in the direction shown. When a flat-reflecting mirror such as is shown at 12 is used, the center portion of the laser amplifying medium does not lase because of the presence of the gap between mirrors 14 and 16. The output beam through the gap is produced by a diffraction effect which takes place within a few wavelengths of the inner ends of mirrors 14 and 16. That portion of the laser radiation which strikes either of the output mirrors 14 or 16 at a distance greater than a few wavelengths away from the gap between the two mirrors is reflected along a path which passes the radiation back through the laser amplifier along a closed path.

As the gap between mirrors 14 and 16 is increased, the output power from the laser amplifier 10 is gradually increased until a maximum output is reached which depends upon the size and type of laser amplifier, mirror size and position, etc. Obviously, when the gap between the two mirrors 14 and 16 becomes too large, no further oscillation can take place, and there is no output.

Figure 2:
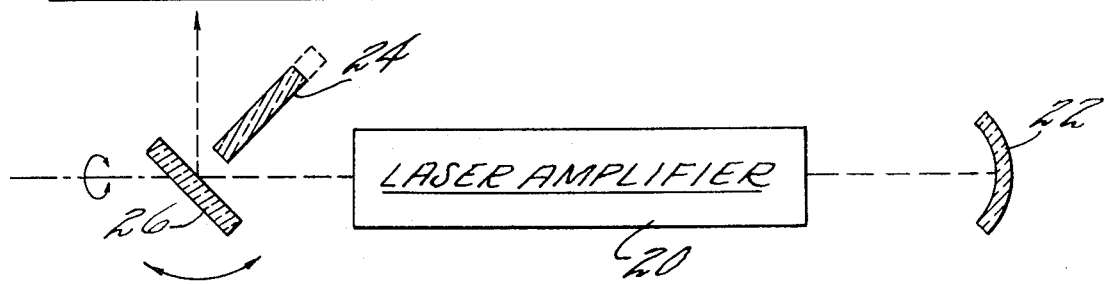
FIG. 2 is a schematic drawing showing a laser oscillator configuration for variable output coupling and beam steering.

FIG. 2 shows an embodiment in which one reflector for the laser amplifier 20 is a cylindrical mirror 22. The other reflector comprises the two mirrors 24 and 26 which are positioned at right angles to each other, but in this embodiment mirror 26 extends slightly from the point at which the plane of mirror 24 intersects mirror 26. In this configuration, the output radiation from laser amplifier 20 will always strike mirror 26 as the radiation proceeds through the gap between mirrors 24 and 26, and mirror 26 will reflect the output beam in a direction at approximately right angles to the axis of laser amplifier 20. Means are provided, as shown in detail in FIG. 3, to rotate mirrors 24 and 26 simultaneously about the line of intersection of the mirror plane and/or about the axis of the laser amplifier. That is, the mirrors may be rotated in the plane of the paper, or about the amplifier axis, or both. Any mechanical arrangement which will rotate both mirrors simultaneously is sufficient. For example, both mirrors could be fixedly attached to a surface which extends in the plane of the paper and rotation of this surface will provide rotation of mirrors 2 ） and 26. The mirror 22 may be spherical or cylindrical with a radius of curvature typically greater than twice the resonator length. In this configuration the laser radiation reflected from mirror 22 tends to converge toward the gap between mirrors 24 and 26, and more energy will be directed into the output gap between the two mirrors with a curved mirror than with a flat mirror. Cylindrical mirrors are particularly appropriate in cases where the amplifying medium 20 is in the form of a long narrow volume from which laser radiation is to be extracted transversely. However, with a cylindrical mirror the gap between the output resonator mirrors cannot be opened as far as when a flat mirror is used. Other types of mirrors may also be used such as rooftop or corner cube reflectors. Whether the mirror 22 is fully or only partially focused at the gap will depend on the particular configuration and on the type of output desired.

Mirrors 24 and 26 may also be adjusted to vary the gap therebetween as described in connection with FIG. 1.

Figure 3:
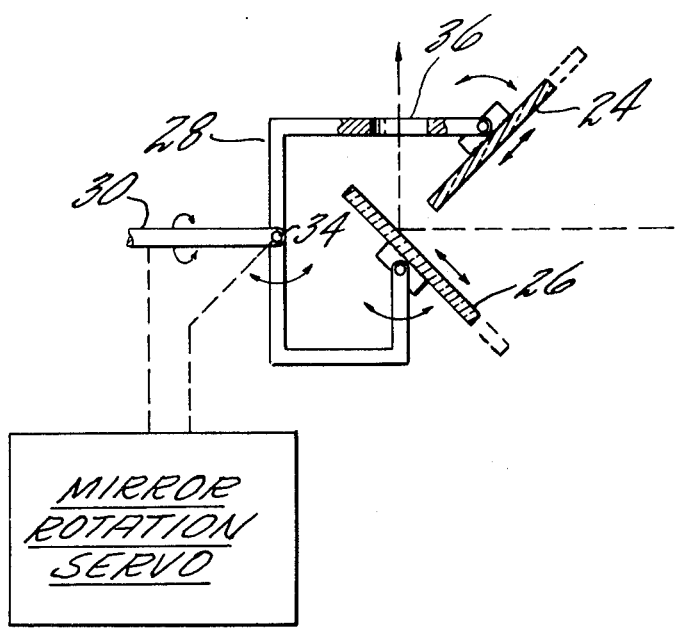
FIG. 3 shows an arrangement for rotating the output mirrors of FIG. 2.

FIG. 3 shows in detail one arrangement for rotating mirrors 24 and 26. Mirrors 24 and 26 are pivotally mounted on a bracket member 28. Each mirror may be rotated in the plane of the paper to adjust the angle between the two mirrors to 90° or thereabout. Each mirror is also mounted for lateral movement in the plane of the mirrors to vary the size of the gap between the mirrors.

A shaft 30 is pivotally attached to bracket 28, the shaft being adapted for rotation when actuated by mirror rotation servo 32. Rotation of shaft 30 will rotate the bracket 28 and consequently mirrors 24 and 26 about the axis of the shaft. Rotation of up to 360° may be provided.

A pin 34 is connected to bracket 28, the pin being adapted for rotation when actuated by mirror rotation servo 32. Actuation of servo 32 causes the pin 34 and the entire bracket assembly to rotate in the plane of the paper, thus rotating mirrors 24 and 26. A smaller range of rotation may be provided in this plane, for example 90°, since mirrors 24 and 26 must always be positioned relative to the laser amplifier to provide feedback.

A gap 36 is provided in bracket 28 so that the laser radiation reflected from mirror 26 will pass through the bracket assembly. A window or lens may be positioned in gap 36.

Thus the arrangement of FIG. 3 provides for steering of the laser radiation and for adjustment of the gap between the mirrors. Other arrangements may be used.

An important property of the right angle reflectors is that this configuration permits both variation of the gap between the two mirrors and rotation of the two mirrors simultaneously with minimal impairment of the resonator characteristics.

In FIG. 2 variation of the gap between the two mirrors 24 and 26 will increase the output beam until a maximum is reached after which time the laser output will decrease. The two mirrors 24 and 26 may be rotated up to 30° or so about the line at which their planes intersect, depending upon the size and type of laser amplifier and mirrors. Rotation about the axis of the laser amplifier is unlimited if the amplifying medium is cylindrically symmetric about this axis.

The amplifying medium may be any medium exhibiting suitable gain at the frequency of the desired laser output. Angular alignment sensitivity and maximum power outputs with the configurations shown are comparable to those produced with confocal resonators using the same amplifying medium. Output power is continuously variable from zero to maximum, and output beam steering over a range of tens of degrees is provided.

There are several angles very close to 90°, as well as the 90° angle, at which mirrors 14 and 16 may be set to obtain laser oscillators. The optimum angle will depend on the type of amplifying medium and on the type of reflectors. Thus it would be convenient to provide for a small adjustment of this angle.

The cross section of beam output from the resonators described will be rectangular rather than circular due to the geometry of the resonators. Optics such as lenses to focus or otherwise control the output beam may be provided. If the resonator mirrors are curved rather than flat, or if a plurality of resonator mirrors are provided, the output beam and the oscillation may be further controlled.

It is to be understood that the invention is not limited to the specific embodiment herein illustrated and described but may be used in other ways without departure from its spirit as defined by the following claims.

I claim:
1. An output coupler for a laser comprising
   first and second reflecting mirrors positioned at an angle to the axis of an active laser medium and at substantially right angles to each other, said mirrors being spaced from each other to define a gap therebetween,
   said mirrors being positioned to intercept radiation emanating from said active laser medium and to reflect at least a portion of said radiation back through said active laser medium, a portion of said radiation passing through the gap between said mirrors,
   said mirrors being flat and positioned so that the plane defined by one of said mirrors intersects the other said mirror along a line substantially perpendicular to the axis of said active laser medium, said other mirror extending beyond the line of intersection with said one mirror,
   the portion of the laser radiation which passes through said gap intercepting the extended portion of said other mirror and being deflected therefrom at an angle to the axis of said active laser medium.

2. An output coupler as in claim 1 and including means for rotating said mirrors in a plane including the axis of said active laser medium to vary the direction of deflection of said radiation.

3. An output coupler as in claim 1 and including means for rotating said mirrors about the active laser axis of said medium to vary the direction of deflection of said radiation.

4. A laser oscillator comprising
   an active laser medium,
   a feedback cavity for said active laser medium including an output reflector comprising first and second mirrors positioned at an angle to the axis of said active laser medium and at substantially right angles to each other, said mirrors being spaced apart from each other to define a gap therebetween,
   the width of said gap being variable to vary the output from said laser oscillator,
   one of said output resonator mirrors being extended to intercept the laser radiation passing through said gap and to deflect said radiation at an angle to the axis of said active laser medium.

5. A laser oscillator as in claim 4 and including means for rotating said first and second mirrors in a plane including the axis of said active laser medium to vary the direction of deflection of said laser radiation.

6. A laser oscillator as in claim 4 and including means for rotating said first and second mirrors about the axis of said active laser medium to vary the direction of deflection of said laser radiation.

7. A laser oscillator as in claim 4 in which said feedback cavity includes a curved third mirror.

8. A laser oscillator as in claim 7 in which said third mirror has a radius of curvature which converges at least a portion of the radiation reflected therefrom toward the gap between the first and second mirrors.

* * * * *

PO-1050
(5/69)

UNITED STATES PATENT OFFICE
CERTIFICATE OF CORRECTION

Patent No. 3,624,546         Dated November 30, 1971

Inventor(s) Carl M. Ferrar

It is certified that error appears in the above-identified patent and that said Letters Patent are hereby corrected as shown below:

Claim 3, column 4, line 29, "active laser axis of said medium"

should read -- axis of said active laser medium --.

Signed and sealed this 13th day of February 1973.

(SEAL)
Attest:

EDWARD M. FLETCHER, JR.
Attesting Officer

ROBERT GOTTSCHALK
Commissioner of Patents